United States Patent [19]
Dent

[11] Patent Number: 6,047,169
[45] Date of Patent: Apr. 4, 2000

[54] RADIO COMMUNICATIONS DEVICE WITH REFERENCE-COMPENSATED POWER DOWN CONTROL AND METHODS OF OPERATING THEREOF

[75] Inventor: Paul Wilkinson Dent, Pittsboro, N.C.

[73] Assignee: Ericsson Inc., Research Triangle Park, N.C.

[21] Appl. No.: 08/870,685

[22] Filed: Jun. 6, 1997

[51] Int. Cl.[7] ................................................ H04B 7/00
[52] U.S. Cl. ........................ 455/127; 455/38.3; 455/343
[58] Field of Search .................................. 455/38.2, 38.3, 455/343, 522, 127, 126, 572, 226.1, 234.1, 234.2, 277.1, 277.2; 340/825.44

[56] References Cited

U.S. PATENT DOCUMENTS

| | | | |
|---|---|---|---|
| 5,224,152 | 6/1993 | Harte | 379/59 |
| 5,416,435 | 5/1995 | Jokinen et al. | 327/113 |
| 5,568,513 | 10/1996 | Croft et al. | 375/224 |
| 5,805,989 | 9/1998 | Ushida | 455/38.3 |
| 5,806,006 | 9/1998 | Dinkins | 455/38.3 |

FOREIGN PATENT DOCUMENTS

| | | | |
|---|---|---|---|
| 0 586 256 A2 | 3/1994 | European Pat. Off. | G04G 3/02 |
| 0 726 508 | 8/1996 | European Pat. Off. . | |
| 0 726 687 A1 | 8/1996 | European Pat. Off. | H04Q 7/32 |
| 2 288 480 | 10/1995 | United Kingdom . | |
| WO 98/20620 | 5/1998 | WIPO . | |

OTHER PUBLICATIONS

International Search Report, PCT/US98/11587, dated Sep. 15, 1998.

*Primary Examiner*—Reinhard J. Eisenzopf
*Assistant Examiner*—Sam Bhattacharya
*Attorney, Agent, or Firm*—Myers Bigel Sibley & Sajovec

[57] ABSTRACT

Power consumption of a radio communications device including a communications reference signal generator which produces a communications reference signal is controlled by selectively energizing the communications reference signal generator according to a time base which is compensated according to the communications reference signal. The communications reference signal generator may be selectively energized by generating a base timing signal, preferably from a lower frequency base timing signal generator, compensating the base timing signal according to the communications reference signal to produce a power timing signal, and selectively enabling power transfer between a power source and the communications reference signal generator according to the power timing signal. A reference-compensated power down interval defined according to the base timing signal and compensated according to the communications reference signal may be determined, and a power down signal generated according to the determined reference-compensated power down interval. Power transfer to the communications reference signal generator may be disabled for the determined reference-compensate power down interval in response to the power down signal. A radio communications circuit may be included which is responsive to the communications reference signal generator and communicates radio communications messages, the power consumption of which may be controlled by selectively energizing according to the compensated time base. Power transfer may be selectively enabled to the communications reference signal generator and the radio communications circuit according to respective first and second power down intervals, allowing power transfer to the communications reference signal generator while the radio communications circuit is disabled.

41 Claims, 6 Drawing Sheets

RADIO COMMUNICATIONS DEVICE WITH REFERENCE-COMPENSATED POWER DOWN CONTROL AND METHODS OF OPERATING THEREOF

Field of the Invention

The present invention relates to radio communications systems and methods of operation thereof, in particular, to apparatus and methods for managing power consumption in radio communications devices.

Background of the Invention

Power consumption generally is an important consideration in the design and operation of radio communications devices such as portable cellular radiotelephones, as these devices often are powered by batteries which either may have limited lifetime or, if rechargeable, only operate a few hours before requiring recharging. During recharging, the device may be rendered inoperable and/or immobile for extended periods due to the need to remain connected to a charging unit.

Understandably, considerable design efforts have been expended in developing techniques to reduce the amount of power consumed by the radio device and to thereby extend the period of time between charging or replacement of the batteries. In portable radiotelephones, for example, power-saving circuits and associated methods have been developed which attempt to reduce the amount of power consumed when the radiotelephone is not actively communicating messages. Conventionally, this may be accomplished by shutting down portions of the radiotelephone, e.g., the receiver and the transmitter, during periods when transmissions are not needed or messages are not expected, as described in U.S. Pat. No. 5,568,513 to Croft et al. Typically, this shutdown period is controlled by a standby timer, typically a timer clocked by a radiofrequency signal produced by the communications device's reference oscillator to ensure timing accuracy, as described in, for example, U.S. Pat. No. 5,224,152 to Harte et al.

Although the above-described method of conserving power can significantly extend the life of the batteries used to power the device, the increasing functionality of radio communications devices places more demands on the power source. In addition, the packaging of radio communications devices into increasingly smaller packages reduces the space available for larger-capacity batteries. Accordingly, there is an ever-present need to further reduce power consumption to extend battery life and reduce the need for replacement or recharging of batteries.

SUMMARY OF THE INVENTION

In light of the foregoing, it is an object of the present invention to provide radio communications devices and methods of operating thereof which reduce power consumption.

These and other objects, features and advantages are provided according to the present invention by radio communications devices and methods of operating thereof in which the communications reference signal generator of the device, e.g., the reference oscillator used to provide a carrier reference signal, is selectively energized according to an independently generated time base, e.g., a time base provided by a power timing signal derived from a lower frequency oscillator, the time base being compensated according to the communications reference signal produced by the communications reference signal generator to improve timing accuracy. Preferably, selective energizing of the reference signal generator is achieved by selectively enabling power transfer from a power source to the reference signal generator in response to a power timing signal which is compensated according to the communications reference signal. The power timing signal preferably is generated according to a reference-compensated power interval which is defined according to a base timing signal produced by a lower-frequency base timing signal generator. Preferably, the determined reference-compensate power interval is a reference-compensated power down interval, which may be represented as a power down interval count which is received by a power timer circuit which generates the power timing signal. The power timer circuit and the base timing signal generator may be integrated in a single integrated circuit along with one or more other radio communications circuits such as a receiver, a transmitter, a communications processor and the like, power transfer to which may also be selectively enabled in a manner similar to that employed for the reference oscillator. Power transfer to the communications reference signal generator may be enabled before power transfer to these other radio communications circuits is enabled, allowing the communications reference signal generator to stabilize before these other circuits are energized.

Using a base timing signal to define the power timing signal, the present invention can provide improved power conservation over conventional systems which use a standby timer clocked by a communications reference oscillator, as these systems tend to consume more power due to the higher operating frequency of the communications reference oscillator. Because the power timing signal is compensated according to the communications reference signal, however, the present invention can compensate for inaccuracies in the base timing signal, thus potentially yielding improved power timing accuracy over that typically provided by a standalone timer operating solely off a low-frequency timing oscillator. This improved timing accuracy can result in even greater power conservation, as power up of the reference oscillator and other circuits can be more optimally controlled. In addition, compensation of the base timing signal allows for the use of lower-power, on-chip base timing signal generators which tend to be less accurate than, for example, standalone CMOS clock chips. Because the base timing signal generator can be integrated as a low frequency, low power oscillator on a single chip along with other radio communications circuits, valuable circuit board space can be conserved, an important consideration in, for example, miniaturized hand-held radio communications devices.

In particular, according to the present invention, a radio communications device includes a communications reference signal generator, e.g., a reference oscillator, which produces a communications reference signal, and means for selectively energizing the communications reference signal generator according to a time base which is compensated according to the communications reference signal. Preferably, the device further includes a power source which supplies electrical power, and the means for selectively energizing includes reference-compensated power timing signal generating means, responsive to the communications reference signal generator, for generating a power timing signal which is compensated according to the communications reference signal. Selective power transfer enabling means are responsive to the power down timing signal generator for selectively enabling power transfer between the power source and the communications reference signal generator according to the power timing signal. More preferably, the reference-compensated power timing signal generating means includes a base timing signal generator which produces a base timing signal, and reference-compensated power interval determining means, responsive to the base timing signal generator and to the communications reference signal generator, for determining a reference-compensated power interval which is defined according to the base timing signal and compensated according to the communications reference signal. Power timing signal generating means are responsive to the reference-compensated power cycle determining means for generating the power timing signal according to the determined reference-compensate power interval. The base timing signal preferably has a frequency less than the frequency of the communications reference signal, thus allowing the base timing signal to be produced by an oscillator having a lower power consumption than the reference oscillator used to produce the communications reference signal.

In an embodiment according to the present invention, the reference-compensated power interval determining means includes means for determining a reference-compensated power down interval. The power timing signal generating means includes means, responsive to the reference-compensated power down interval determining means, for generating a power down signal according to the determined reference-compensated power down interval. The selective power transfer enabling means includes means, responsive to the means for generating a power down signal, for disabling power transfer between the power source and the communications reference signal generator for the determined reference-compensated power down interval, in response to the power down signal. The reference-compensated power interval determining means may further include means for determining a power up interval, and the power timing signal generating means may include means, responsive to the means for determining a power up interval, for generating a power up signal according to the determined power up interval. The selective power transfer enabling means may include means for enabling power transfer between the communications reference signal generator and the power source for the determined power up interval, in response to the power up signal.

The means for determining a reference-compensated power down interval may include means for generating a power down start signal indicating commencement of a power down period. The power timing signal generating means includes a power timer circuit, responsive to the base timing signal generator and to the means for generating a power down start signal, which generates the power down signal in response to the power down start signal and which generates the power up signal in response to occurrence of a predetermined number of cycles of the base timing signal after generation of the power down start signal, the predetermined number of cycles being defined by the determined reference-compensated power down interval. The device may further include a radio communications circuit which communicates radio communications messages. The means for generating a power down start signal may be responsive to the radio communications circuit for generating the power down start signal.

In another embodiment according to the present invention, the reference-compensated power interval determining means includes compensation factor determining means, responsive to the base timing signal generator and to the communications reference signal generator, for determining a compensation factor relating the base timing signal and the communications reference signal. Means are provided, responsive to the compensation factor determining means, for determining a reference-compensated power interval according to the compensation factor. The compensation factor determining means may include means for determining a compensation factor representing a number of cycles of the communications reference signal occurring during a predetermined number of cycles of the base timing signal.

The means for determining a reference-compensated power interval may include reference-compensated power down interval determining means, responsive to the compensation factor determining means, for determining a reference-compensated power down interval according to the compensation factor, and means for generating a power down start signal indicating a start of a reference-compensated power down interval. The power timing signal generating means may include a power timer circuit, responsive to the base timing signal generator, to the means for determining a reference-compensated power down interval, and to the means for generating a power down start signal, which generates a power down signal in response to the power down start signal and which generates a power up signal in response to occurrence of a predetermined number of cycles of the base timing signal after generation of the power down start signal, the predetermined number of cycles being defined by the determined reference-compensated power down interval. The selective power transfer enabling means may include means, responsive to the power timer circuit, for enabling power transfer between the power source and the reference-compensated power down interval determining means in response to the power up signal and for disabling power transfer between the power source and the reference-compensated power down interval determining means in response to the power down signal.

The power timer circuit may include a first counter circuit, responsive to the base timing signal generator, which maintains a first count, the first counter circuit counting the first count in response to cycling of the base timing signal and generating the power up signal in response to the first count reaching a predetermined count value. The compensation factor determining means may include a second counter circuit, responsive to the communications reference signal generator and to the base timing signal generator, which maintains a second count, the second counter circuit counting the second count in response to cycling of the communications reference signal and producing the compensation factor from the second count in response to occurrence of a predetermined number of cycles of the base timing signal.

The means for determining a reference-compensated power down interval may include means for producing a power down interval count representing the power down interval in terms of cycles of the base timing signal, and the power timer circuit and the compensation factor determining means may be integrated in a power control circuit. The power control circuit includes a first counter circuit, responsive to the means for producing a power down interval count and to the base timing signal generator, which receives the reference-compensated power down interval count and maintains a first count therefrom, the first counter circuit counting the first count in response to cycling of the base timing signal. The first counter circuit produces the power up signal in response to the first count reaching a predetermined count value and produces a reset signal in response to occurrence of a predetermined number of cycles of the base timing signal. The power control circuit also includes a second counter circuit, responsive to the first counter circuit and to the communications reference signal generator, which receives the reset signal, resets a second count to a predetermined value in response thereto, and counts the second count from the predetermined value in response to cycling of the communications reference signal. The second counter circuit produces the compensation factor from the second count in response to the reset signal.

In another embodiment according to the present invention, the base timing signal generator, the reference-compensated power interval determining means, and the selective power transfer enabling means are integrated in a single integrated circuit. The communications reference signal generator may include a reference crystal and a communications reference oscillator circuit electrically connected thereto, and may be integrated in single integrated circuit along with the base timing signal generator, the reference-compensated power interval determining means, and the selective power transfer enabling means.

In another embodiment of the invention, a radio communications device includes a communications reference signal generator which produces a communications reference signal, and a radio communications circuit, responsive to the communications reference signal generator, which communicates radio communications messages. Means are provided, responsive to the communications reference signal generator, for selectively energizing the communications reference signal generator and the radio communications circuit according to a time base which is compensated according to the communications reference signal. The radio communications device may further include a power source which supplies electrical power. The means for selectively energizing may include reference-compensated power timing signal generating means, responsive to the communications reference signal generator and to the radio communications circuit, for producing a power timing signal which is compensated according to the communications reference signal, and selective power transfer enabling means, responsive to the power down timing signal generator, for selectively enabling power transfer between the power source and the communications reference signal generator and for selectively enabling power transfer between the power source and the radio communications circuit according to the power timing signal.

The reference-compensated power timing signal generating means may include a base timing signal generator which produces a base timing signal, and reference-compensated power interval determining means, responsive to the base timing signal generator, to the communications reference signal generator and to the radio communications circuit, for determining first and second reference-compensated power intervals for the communications reference signal generator and the radio communications circuit, respectively, each of which are defined according to the base timing signal and compensated according to the communications reference signal. Power timing signal generating means are responsive to the reference-compensated power interval determining means for generating the power timing signal according to the first and second reference-compensated power intervals.

The reference-compensated power interval determining means may include means for determining first and second reference-compensated power down intervals for the communications reference signal generator and the radio communications circuit, respectively. The power timing signal generating means may include means, responsive to the reference-compensated power down interval determining means, for generating first and second power down signals according to the determined first and second reference-compensated power down intervals, respectively. The selective power transfer enabling means may include means, responsive to the means for generating first and second power down signals, for disabling power transfer between the power source and the communications reference signal generator for the first power down interval in response to the first power down signal and for disabling power transfer between the power source and the radio communications circuit for the determined second reference-compensated power down interval in response to the second power down signal. The reference-compensated power interval determining means may further include means for determining first and second power up intervals for the communications reference signal generator and for the radio communications circuit, respectively. The power timing signal generating means may include means, responsive to the means for determining first and second power up intervals, for generating first and second power up signals according to the determined first and second power up intervals, respectively. The selective power transfer enabling means may include means for enabling power transfer between the power source and the communications reference signal generator for the determined first power up interval in response to the first power up signal and for enabling power transfer between the power source and the radio communications circuit for the determined second power up interval in response to the second power up signal.

In yet another embodiment, the reference-compensated power interval determining means further includes means, responsive to the radio communications circuit, for producing a power down start signal. The means for generating first and second power down signals may include means, responsive to the means for producing a power down start signal, for generating the first and second power down signals in response to the power down start signal. The means for generating first and second power up signals may include means, responsive to the reference-compensated power down interval determining means, for generating the first power up signal in response to occurrence of a first predetermined number of cycles of the base timing signal and for generating the second power up signal in response to occurrence of a second predetermined number of cycles of the base timing signal, the first and second predetermined numbers corresponding to the first and second power down intervals, respectively. The means for generating first and second power up signals may generate the first power up signal before the second power up signal such that the selective power transfer enabling means enables power transfer between the power source and the communications reference signal generator while disabling power transfer between the power source and the radio communications circuit. Controlled power up of the communications reference oscillator and the radio communications circuit may thereby be provided.

In yet another embodiment according to the present invention, a radio communications device includes means, responsive to a communications reference signal generator, for selectively energizing a radio communications circuit according to a time base which is compensated according to the communications reference signal, and means, responsive to the radio communications circuit, for de-energizing the communications reference signal generator while the radio communications circuit is de-energized and for energizing the communications reference signal generator a sufficient time before the radio communications circuit is energized to allow the communications reference signal to achieve a predetermined accuracy. The means for selectively energizing the radio communications circuit may include a base timing signal generator which produces a base timing signal and reference-compensated power interval determining means, responsive to the base timing signal generator, to the communications reference signal generator and to the radio communications circuit, for determining a reference-compensated power interval for the radio communications circuit which is defined according to the base timing signal and compensated according to the communications reference signal. Power timing signal generating means are responsive to the reference-compensated power interval determining means for generating a power timing signal according to the determined reference-compensated power interval. Selective power transfer enabling means are responsive to the power timing signal generating means for selectively enabling power transfer between the power source and the radio communications circuit according to the power timing signal. The reference-compensated power interval determining means may include means for determining the reference-compensated power interval when the communications reference signal has the predetermined accuracy, and the means for de-energizing the communications reference signal generator may de-energize the communications reference signal generator upon de-energizing of the radio communications circuit.

According to method aspects of the present invention, power consumption of a radio communications device including a communications reference signal generator which produces a communications reference signal is controlled by selectively energizing the communications reference signal generator according to a time base which is compensated according to the communications reference signal. The radio communications device may include a power source which supplies power, and may be selectively energized by generating a base timing signal, compensating the base timing signal according to the communications reference signal to produce a power timing signal, and selectively enabling power transfer between the power source and the communications reference signal generator according to the power timing signal. Compensation of the base timing signal may include determining a reference-compensated power interval which is defined according to the base timing signal and which is compensated according to the communications reference signal, and generating the power timing signal according to the determined reference-compensate power interval.

According to one method aspect, the step of determining a reference-compensated power interval includes the step of determining a reference-compensated power down interval. The step of generating a power timing signal includes the step of generating a power down signal according to the determined reference-compensated power down interval, and the step of selectively enabling power transfer includes the step of disabling power transfer between the power source and the communications reference signal generator for the determined reference-compensated power down interval in response to the power down signal. The radio communications device may include a radio communications circuit which is responsive to the communications reference signal generator and communicates radio communications messages, the power consumption of which may be controlled by selectively energizing the radio communications circuit according to the reference-compensated time base. Power transfer may be selectively enabled to the communications reference signal generator and the radio communications circuit according to first and second power down intervals, allowing power transfer to the communications reference signal generator to be enabled while power transfer to the radio communications circuit is disabled. In this manner, the communications reference signal generator may be energized before the radio communications circuit is energized, thus allowing the communications reference signal to stabilize before performing radio communications functions.

According to yet another method aspect, a radio communications circuit is selectively energized according to a time base which is compensated according to the communications reference signal. A communications reference signal generator to which the radio communications circuit is responsive is de-energized while the radio communications circuit is de-energized, and is energized a sufficient time before the radio communications circuit is energized to allow the communications reference signal to achieve a predetermined accuracy. The reference-compensated power interval preferably is determined while the reference-compensated power interval when the communications reference signal has the predetermined accuracy.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
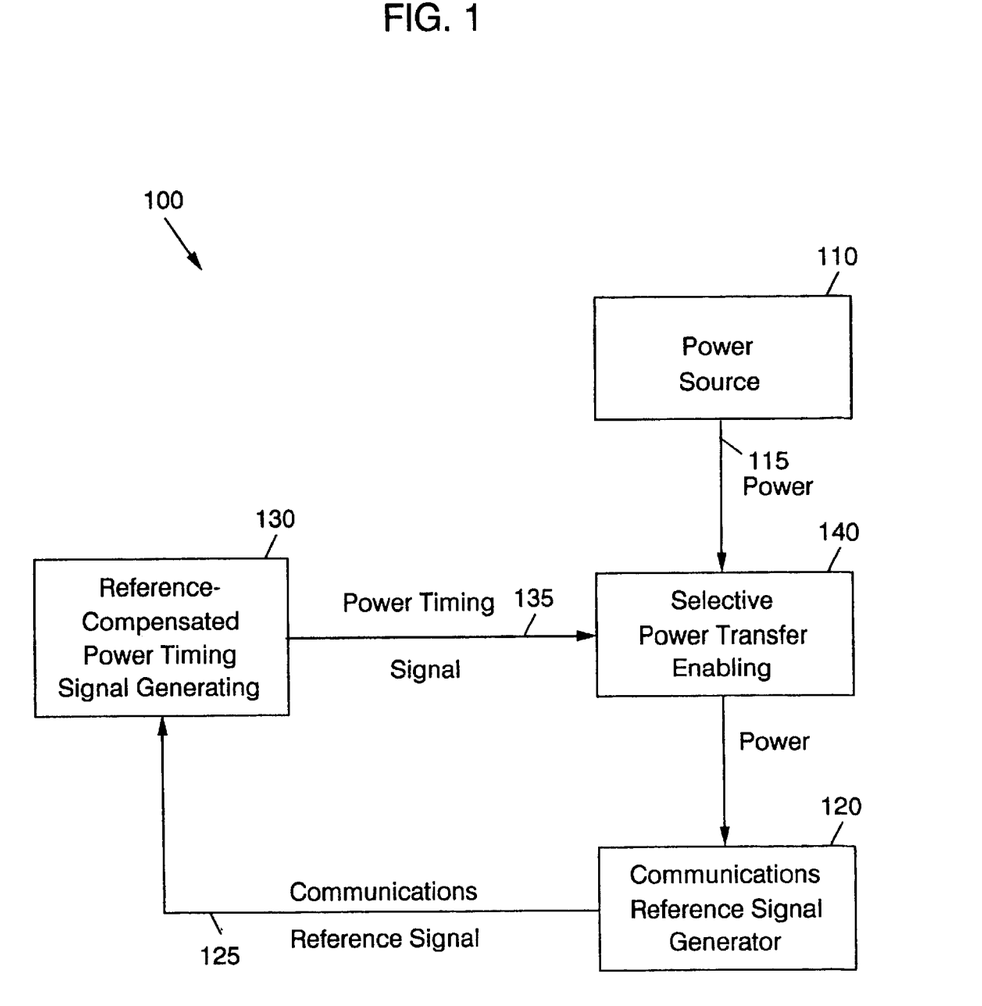
FIG. 1 is a schematic block diagram illustrating a radio communications device according to the present invention.

FIG. 1 illustrates a radio communications device 100 according to the present invention. The device 100 includes a power source, e.g., a replaceable or rechargeable battery or similar power source 110, which produces power 115. Communications reference signal generator 120 generates a communications reference signal 125. Reference-compensated power timing signal generating means 130 generates a power timing signal 135 which is compensated according to the communications reference signal 125. Selective power transfer enabling means 140 are responsive to the reference-compensated power timing signal generating means 130 for selectively enabling power transfer between the power source 110 and the communications reference signal generating means 120.

Those skilled in the art will understand that the communications reference signal generator 120 may include a radio frequency reference oscillator circuit as is typically employed to provide a reference signal for purposes of modulation and demodulation, among other functions. Those skilled in the art will appreciate that the communications reference signal generator 120 may also include other circuit components such as logic circuits, signal conditioners and the like. It will also be understood that the communications reference signal 125 may include a sinusoidal signal such as that produced by, for example, a reference oscillator circuit, or may include other periodic signals such as a high speed digital clock signal derived from a reference oscillator and used to control a microprocessor or digital signal processing (DSP) chip.

Figure 2:
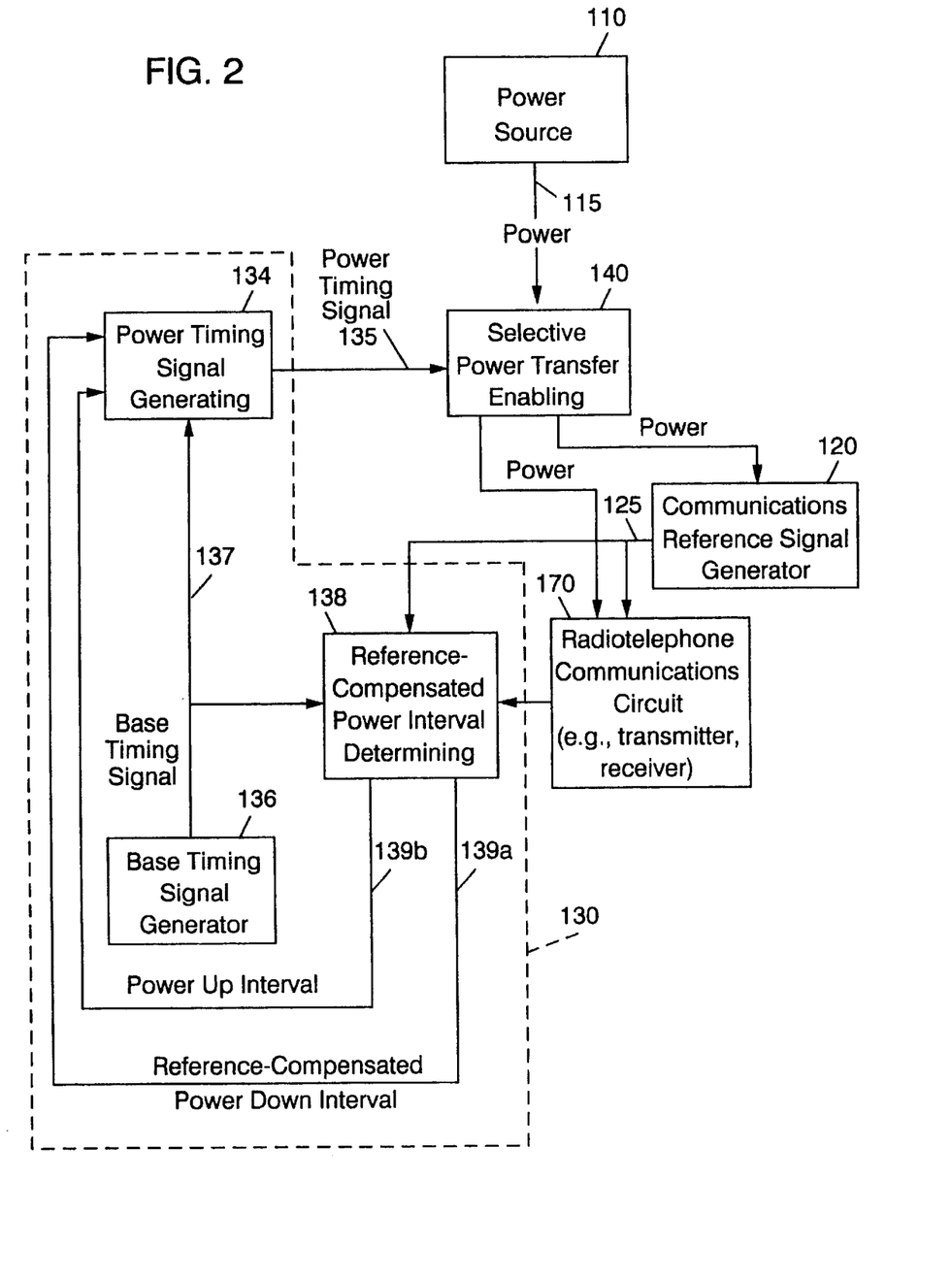
FIG. 2 is a schematic block diagram illustrating an embodiment of a radio communications device according to the present invention.

Referring to FIG. 2, the reference-compensated power timing signal generating means 130 in the illustrated embodiment includes a base timing signal generator 136, e.g., a low power oscillator circuit, which generates a base timing signal 137. Reference-compensated power interval determining means 138 are responsive to the base timing signal generator 136 and the communications reference signal generator 120 for determining a reference-compensated power interval which is defined according to the base timing signal 137 and compensated according to the communications reference signal 125. Preferably, the power interval determining means 138 determines a reference-compensated power down interval 139*a* which is defined according to the base timing signal 137 and compensated according to the communications reference signal 125, as well as a power up interval 139*b*. At least one radiotelephone communications circuit 170 may also be included, including circuitry such as transmitters, receivers, signal processors and like, which may be responsive to the communications reference signal generator 120. Power transfer to radio communications circuit 170 may be selectively enabled by the selective power transfer enabling means 140 in response to the power timing signal 135 to thereby reduce power consumption from the power source 110. The power timing signal generating means 134 may be responsive to the reference-compensated power interval determining means 138, the radio communications circuit 170 and the base timing signal generator 136 for generating the power timing signal 135. For example, the radio communications circuit 170 may detect a break in communications appropriate for powering down the radio communications circuit 170 and the communications reference signal generator 120, along with a measure of the expected time before these circuits need to be re-energized to receive an expected message. This information may be provided to the reference-compensated power interval determining means 138. In turn, the power interval determining means 138 may determine a power down interval and initiate power down of the radio communications circuit 170 and the communications reference signal generator 120.

According to one embodiment, the base timing signal generator 136 produces a base timing signal 137 which has a lower frequency than the communications reference signal 125. As those skilled in the art will appreciate, the power consumption of circuits which produce oscillating signals generally increases with increasing frequency of oscillation. Accordingly, the base timing signal 137 preferably has a significantly lower frequency than the communications reference signal 125 to further reduce the power consumption of the radio communications device 100 during a shutdown period in comparison to a conventional device which uses a standby timer operating off the device's reference oscillator.

For example, the communications reference signal generator 120 may include a 10–20 MHZ temperature-compensated reference oscillator circuit as might be employed in a cellular radiotelephone, while the base timing signal generator 136 may include a 32 kHz on-chip oscillator circuit which may consume significantly less power than the higher frequency reference oscillator circuit. It will be understood by those skilled in the art that the base timing signal generator 136 may also include additional components such as logic circuits, signal conditioners and the like.

Those skilled in the art will understand that portions of the reference-compensated power timing signal generating means 130, including reference-compensated power interval determining means 138 and power timing signal generating means 134, may be implemented using special purpose hardware, software or firmware running on a general or special purpose data processor such as a microprocessor, microcontroller or application specific integrated circuit (ASIC), or combinations thereof. Similarly, the selective power transfer enabling means 140 may similarly include special-purpose hardware such as switching transistors and logic gates, software and/or firmware running on a microcontroller or other processor, or combinations thereof.

Figures 3, 3A:
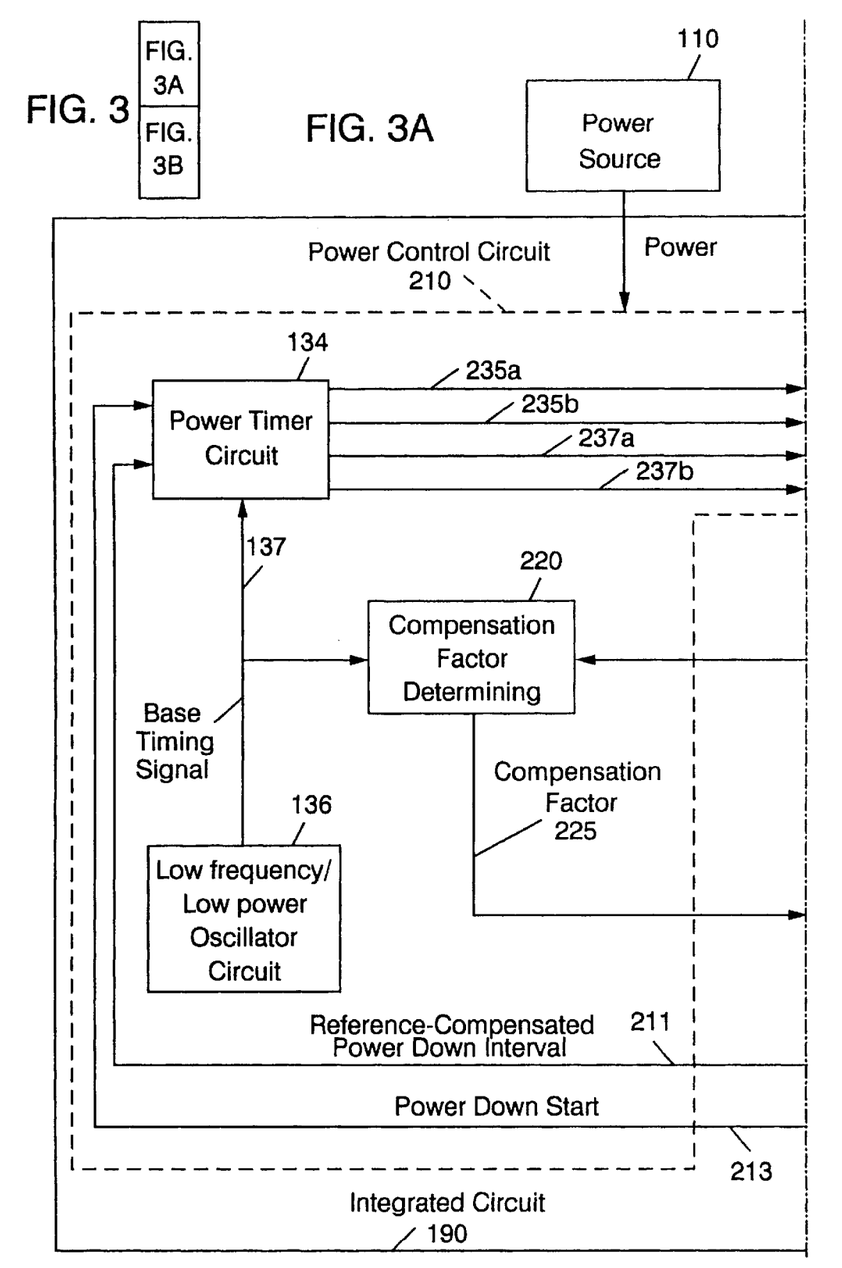
FIG. 3 is a schematic block diagram illustrating another embodiment of a radio communications device according to the present invention.
Figure 3B:
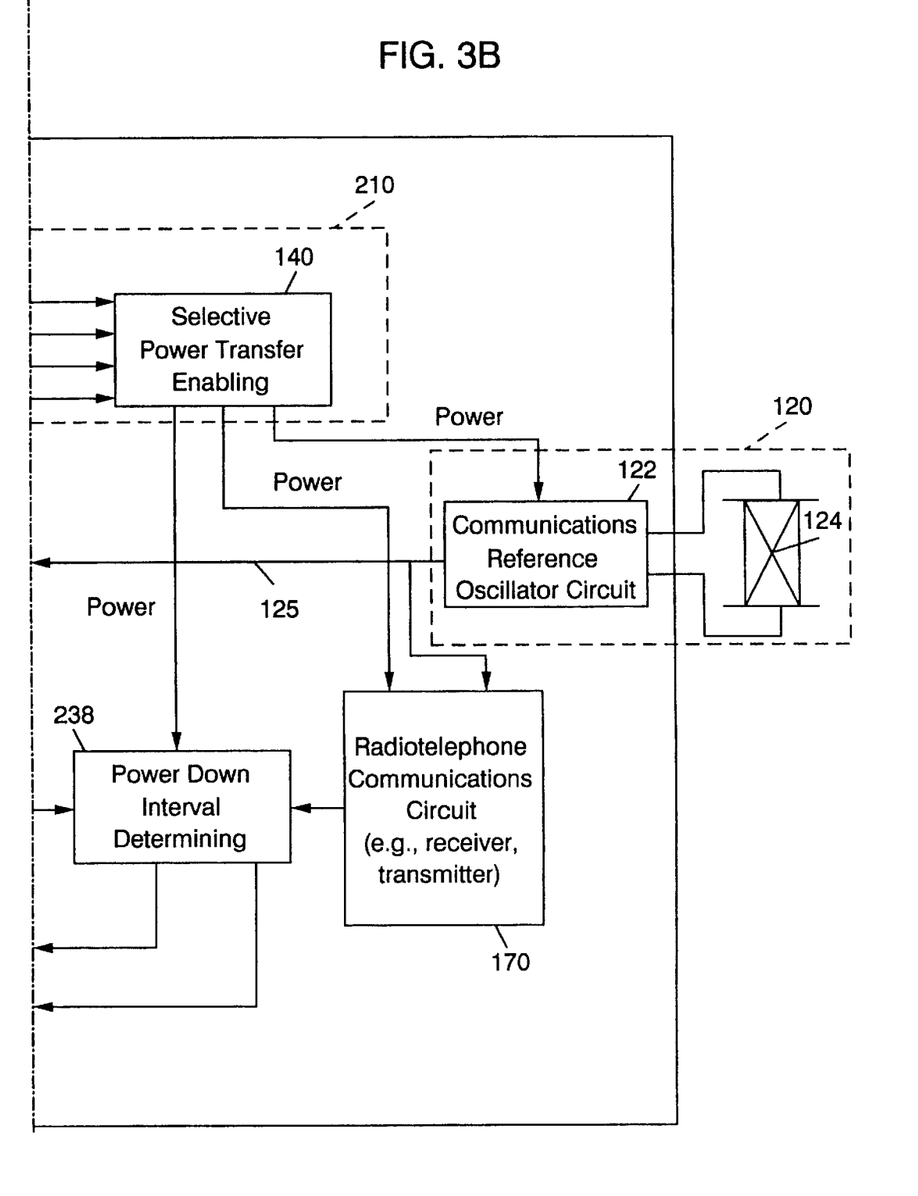

FIG. 3 illustrates another embodiment of a radiotelephone communications device according to the present invention in which many of the above-described functions may be implemented using a single integrated circuit 190 such as an application specific integrated circuit (ASIC). Power is provided to a power control circuit 210 which includes power timing signal generating means in form of a power timer circuit 134 which receives a reference-compensated power down interval 211 defined according to the base timing signal 137, and a power down start signal 213 which indicates commencement of a power down interval. The power timer circuit 134 produces first and second power up signals 235*a*, 235*b* and first and second power up signals 237*a*, 237*b* from the power down start signal 213 and the reference-compensated power down interval 211. The selective power transfer enabling means 140 is responsive to the first and second power up signals 235*a*, 235*b* and the first and second power down signals 237*a*, 237*b* for selectively enabling power transfer between the power source 110 and the communications reference signal generator 120, here shown as a communications oscillator circuit 122 coupled to a high frequency crystal 124, and between the power source 110 and the radio communications circuit 170. The power control circuit 210 also includes compensation factor determining means 220 for determining a compensation factor 225 which is used by power interval determining means 238 to determine the reference-compensated power down interval 211.

The power interval determining means 238 includes means for determining a power down interval 211, as well as means for producing the power down start signal 213 responsive to the radio communications circuit 170. For example, the radio communications circuit 170 may include software or other logic which determines that reception of radio communications messages may not be required for a predetermined period of time, as described, for example, in U.S. Pat. No. 5,568,513 to Croft et al. The radiotelephone communications circuit 170 may communicate this information to the power interval determining means 238, which may then determine, e.g., compute, a reference-compensated power down interval 211 corresponding to the amount of time before a next message is expected. The power interval determining means 238 then may produce a power down start signal to indicate commencement of a power down period which extends for the power down interval thereafter. The power timing signal generating means 134 may generate a power down signal 235a, 235b in response to the power down signal 213. After the power down interval has elapsed, the power timing signal generating means 134 may generate a power up signal 237a, 237b. Because the power down interval is compensated according to the communications reference signal 125, greater accuracy can be achieved in powering up the communications reference signal generator 120 and the radio communications circuit 170, allowing for decreased power consumption as these components are not energized until actually needed, while still ensuring that an expected message is not missed. In contrast, conventional systems which use a lower accuracy standby timer inadvertently may power up these components before needed or delay power up until after a message is present, thus either wasting power or causing a message to be missed.

For the embodiment illustrated in FIG. 3, respective first and second power down intervals are determined for the communications reference oscillator circuit 122 and the radio communications circuit 170, and respective first and second power up signals 235a, 235b and respective first and second power down signals 237a, 237b are generated therefrom. In this manner, energizing of the radio communications circuit 170 may be delayed with respect to the reference oscillator circuit 122, allowing the/reference oscillator circuit 122 to stabilize before the radio communications circuit 170 becomes operational.

Figure 4:
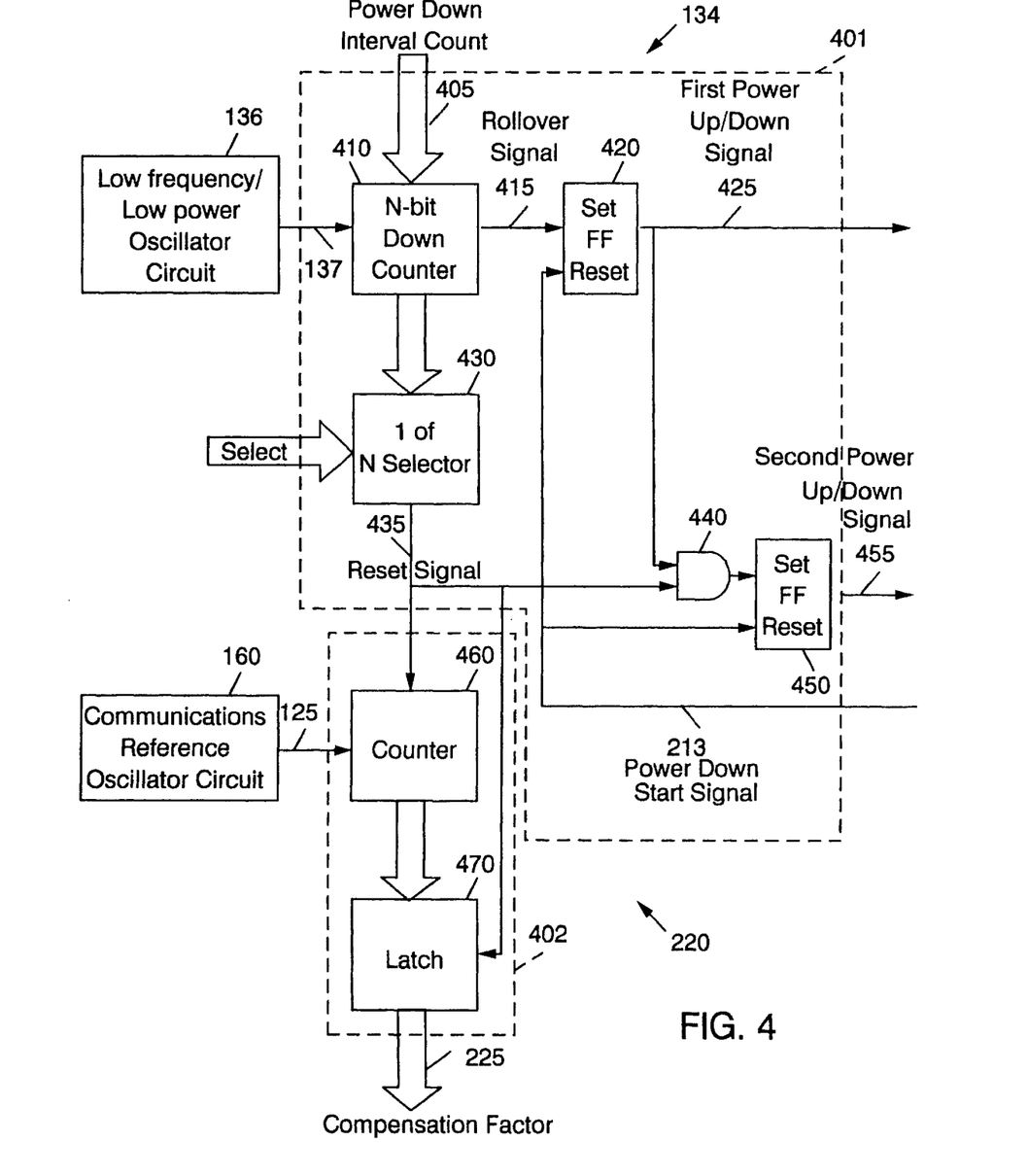
FIG. 4 is a schematic block diagram illustrating an embodiment of a power control circuit according to the present invention present invention.

FIG. 4 provides a detailed illustration of a circuit for implementing functions of the power timer circuit 134 and the compensation factor determining means 220, in particular, a pair of counter circuits 401, 402 which generate first and second power up/down signals 425, 455 for controlling power transfer and a compensation factor 225. The first counter circuit 401 includes an N-bit counter 410 which receives a power down interval count 405 which is a digital representation of the power down interval 211 determined by the power interval determining means 238. The counter 410 counts (up or down) from this count, eventually generating a rollover signal 415, e.g., an overflow or an underflow signal, which sets a flip-flop 420 to generate a power up signal. A 1-of-N selector 430 selects one of the outputs of the counter 410 to produce a reset signal 435 which is asserted after occurrence of a predetermined number of cycles of the base timing signal 137 which clocks the counter 410. This reset signal 435 is used to reset a second counter 460 in the second counter circuit 402 which determines a compensation factor 225 representing a measurement of the number of cycles of the communications reference signal 125 occurring during a predetermined number of cycles of the base timing signal 137. The reset signal 435 is also used, via a logic gate 440, to set another flip flop 450 and generate a second power up signal 455 after a predetermined number of cycles of the base timing signal 137. As those skilled in the art will appreciate, the first power up signal 425 may be used to enable power transfer to the communications reference oscillator circuit 122, while the second power up signal 455 can be used to enable power transfer to other radio communications circuits such as the radio communications circuit 170 of FIG. 4. The compensation factor 225 may be produced by latching the output of the second counter 460 in a latch 470 in response to the reset signal 435. First and second power down signals 425, 455 are generated by resetting the flip-flops 420, 450 with the power down start signal 213.

Although both the communications reference signal generator 120 and the radio communications circuit 170 may be energized and de-energized based on a reference-compensated power interval, the communications reference signal generator need not be controlled to the same degree of accuracy as the radio communications circuit 170, the latter desirably being controlled with high accuracy in order to ensure synchronization with a communications system. According to another aspect of the invention, it is sufficient that the communications reference signal generator 120 is energized a sufficient time before the radiotelephone circuit 170 is energized to allow the communications reference signal 125 produced by the communications reference signal generator 120 to achieve a predetermined accuracy. Referring back to FIG. 3, this may be accomplished by generating the first power up and power down signals 235a, 237a (which control power transfer to the communications reference signal generator 120) independently, without use of the compensation factor 225 determined by the compensation factor determining means 220, while the second power up and power down signals 235b, 237b (which control power transfer to the radio communications circuit 170) may be generated according to the reference-compensated power down interval 211. Instead of using a reference-compensated interval, for example, the first power down signal 237a may be generated in response to the power down start signal 213 and the first power up signal 235a may be generated in response to elapse of a fixed number of cycles of the base timing signal 137 after assertion of the power down start signal 213.

Figure 5:
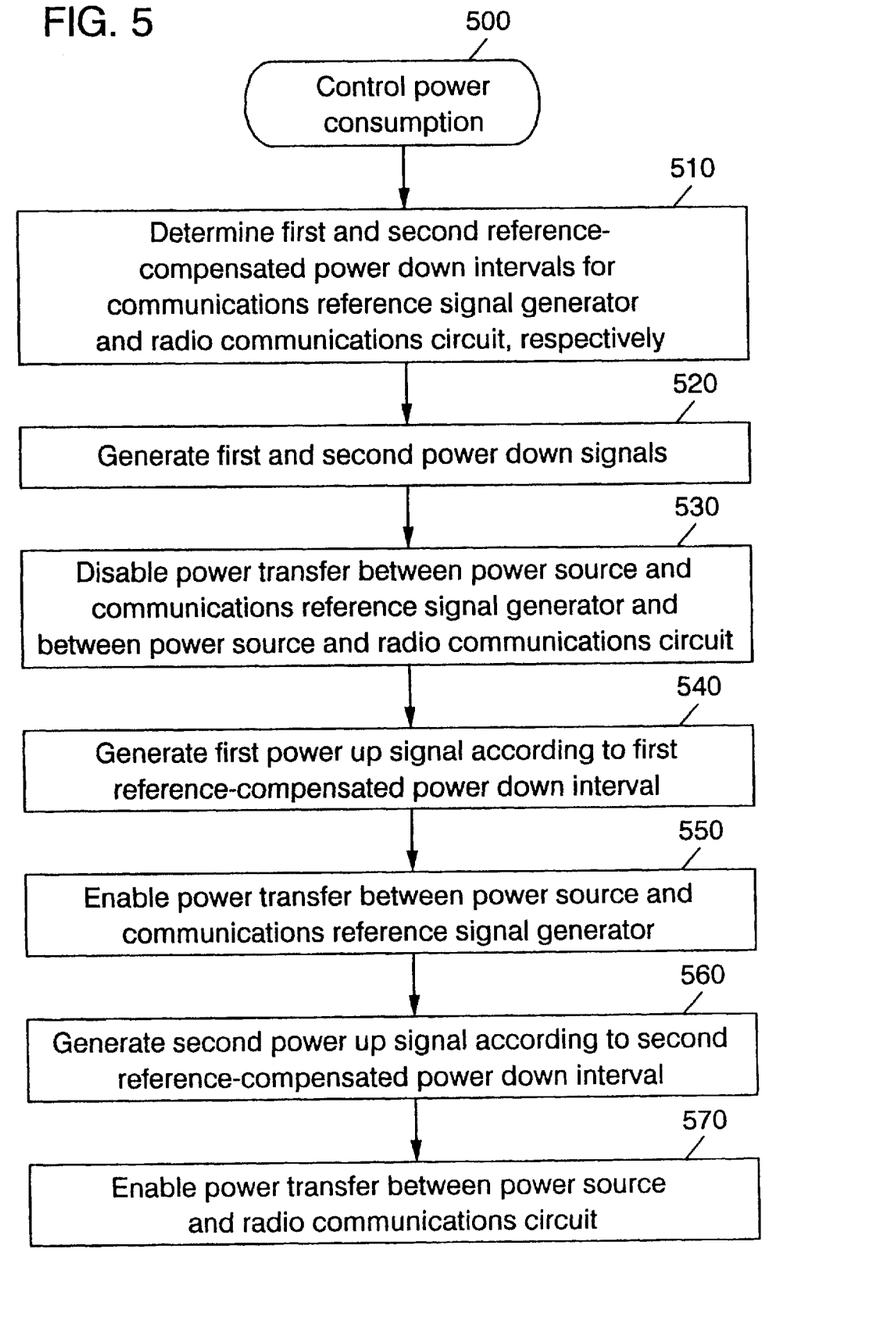
FIG. 5 is a flowchart illustration of operations for controlling power consumption in a radio communications device according to the present invention.

FIG. 5 illustrates exemplary operations for controlling power consumption in a radio communications device according to the present invention (Block 500). First and second reference-compensated power down intervals are determined for a communications reference signal generator and a radio communications circuit of the device, respectively (Block 510). First and second power down signals are then generated (Block 520), for example, from a power down start indication provided by the radio communications circuit of the device, e.g., an indication of a quiescent communications interval as described above. Power transfer between the device's power source and the communications reference signal generator and between the power source and the radio communications circuit is then disabled in response to the first and second power down signals (Block 530). A first power up signal is then generated according to the first power down interval (Block 540), and power transfer between the power source and the communications reference signal generator is enabled in response thereto (Block 550). A second power up signal is generated according to the second power down interval (Block 560), and power transfer between the power source and the radio communications circuit is enabled in response thereto (Block 570).

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A radio communications device, comprising:
   a communications reference signal generator which produces a communications reference signal;
   a power source which supplies electrical power;
   reference-compensated power timing signal generating means, responsive to said communications reference signal generator, for generating a reference-compensated power timing signal which is compensated according to said communications reference signal, the reference-compensated power timing signal generating means including:

a reference-compensated power interval determining means, responsive to said communications reference signal generator, for determining a reference-compensated power interval for the power timing signal, the reference-compensated power interval being compensated according to said communications reference signal; and selective power transfer enabling means, responsive to said power timing signal generating means, for selectively enabling power transfer between said power source and said communications reference signal generator based on said reference-compensated power timing signal.

2. A radio communications device, comprising:

a communications reference signal generator which produces a communications reference signal;

a power source which supplies electrical power;

selective power transfer enabling means, responsive to said power timing signal generating means, for selectively enabling power transfer between said power source and said communications reference signal generator according to said power timing signal;

a base timing signal generator which produces a base timing signal;

reference-compensated power interval determining means, responsive to said base timing signal generator and to said communications reference signal generator, for determining a reference-compensated power interval which is defined according to said base timing signal and compensated according to said communications reference signal; and power timing signal generating means, responsive to said reference-compensated power interval determining means, for generating said power timing signal according to the determined reference-compensated power interval.

3. A radio communications device according to claim 2:

wherein said reference-compensated power interval determining means comprises means for determining a reference-compensated power down interval;

wherein said power timing signal generating means comprises means, responsive to said means for determining a reference-compensated power down interval, for generating a power down signal according to the determined reference-compensated power down interval; and wherein said selective power transfer enabling means comprises means, responsive to said means for generating a power down signal, for disabling power transfer between said power source and said communications reference signal generator for the determined reference-compensated power down interval in response to said power down signal.

4. A radio communications device according to claim 3:

wherein said reference-compensated power interval determining means further comprises means for determining a power up interval;

wherein power timing signal generating means comprises means, responsive to said means for determining a power up interval, for generating a power up signal according to the determined power up interval; and wherein said selective power transfer enabling means comprises means for enabling power transfer between said communications reference signal generator and said power source for the determined power up interval in response to said power up signal.

5. A radio communications device according to claim 4:

wherein said means for determining a reference-compensated power down interval comprises means for generating a power down start signal indicating commencement of a power down period; and wherein said power timing signal generating means comprises a power timer circuit, responsive to said base timing signal generator and to said means for generating a power down start signal, which generates said power down signal in response to said power down start signal and which generates said power up signal in response to occurrence of a predetermined number of cycles of said base timing signal after generation of said power down start signal, said predetermined number of cycles being defined by the determined reference-compensate power down interval.

6. A radio communications device according to claim 5, further comprising a radio communications circuit which communicates radio communications messages, and wherein said means for generating a power down start signal is responsive to said radio communications circuit for generating said power down start signal.

7. A radio communications device according to claim 2, wherein said reference-compensated power interval determining means comprises:

compensation factor determining means, responsive to said base timing signal generator and to said communications reference signal generator, for determining a compensation factor relating said base timing signal and said communications reference signal; and means, responsive to said compensation factor determining means, for determining a reference-compensated power interval according to the determined compensation factor.

8. A radio communications device according to claim 7, wherein said compensation factor determining means comprises means for determining a compensation factor representing a number of cycles of said communications reference signal occurring during a predetermined number of cycles of said base timing signal.

9. A radio communications device according to claim 8:

wherein said means for determining a reference-compensated power interval comprises:

reference-compensated power down interval determining means, responsive to said compensation factor determining means, for determining a reference-compensated power down interval according to the determined compensation factor; and means for generating a power down start signal indicating a start of a reference-compensated power down interval;

wherein said power timing signal generating means comprises a power timer circuit which is responsive to said base timing signal generator, to said means for determining a reference-compensated power down interval, and to said means for generating a power down start signal, and which generates a power down signal in response to said power down start signal and which generates a power up signal in response to occurrence of a predetermined number of cycles of said base timing signal after generation of said power down start signal, said predetermined number of cycles being defined by the determined reference-compensated power down interval; and wherein said selective power transfer enabling means comprises means, responsive to said power timer circuit, for enabling power transfer between said power source and said reference-compensated power down interval determining means in response to said power up signal and for disabling power transfer between said power source and said reference-compensated power down interval determining means in response to said power down signal.

10. A radio communications device according to claim 9:

wherein said power timer circuit comprises a first counter circuit, responsive to said base timing signal generator, which maintains a first count, said first counter circuit counting said first count in response to cycling of said base timing signal and generating said power up signal in response to said first count reaching a predetermined count value; and wherein said compensation factor determining means comprises a second counter circuit, responsive to said communications reference signal generator and to said base timing signal generator, which maintains a second count, said second counter circuit counting said second count in response to cycling of said communications reference signal and determining said compensation factor from said second count in response to occurrence of a predetermined number of cycles of said base timing signal.

11. A radio communications device according to claim 9:

wherein said means for determining a reference-compensated power down interval comprises means for producing a power down interval count representing the determined power down interval in terms of cycles of said base timing signal; and wherein said power timer circuit and said compensation factor determining means are integrated in a circuit comprising:

a first counter circuit, responsive to said means for producing a power down interval count and to said base timing signal generator, which receives the reference-compensate power down interval count and maintains a first count therefrom, said first counter circuit counting said first count in response to cycling of said base timing signal, said first counter circuit producing said power up signal in response to said first count reaching a predetermined count value, said first counter circuit producing a reset signal in response to occurrence of a predetermined number of cycles of said base timing signal; and a second counter circuit, responsive to said first counter circuit and to said communications reference signal generator, which receives said reset signal, resets a second count to a predetermined value in response thereto, and counts said second count from said predetermined value in response to cycling of said communications reference signal, said second counter circuit producing said compensation factor from said second count in response to said reset signal.

12. A radio communications device according to claim 2, wherein said base timing signal generator, said reference-compensated power interval determining means, and said selective power transfer enabling means are integrated in a single integrated circuit.

13. A radio communications device according to claim 12, wherein said communications reference signal generator comprises a reference crystal and a communications reference oscillator circuit electrically connected to said reference crystal, and wherein said base timing signal generator, said reference-compensated power interval determining means, said selective power transfer enabling means and said communications reference oscillator circuit are integrated in a single integrated circuit.

14. A radio communications device according to claim 2, wherein said communications reference signal has a first frequency, and wherein said base timing signal has a second frequency less than said first frequency.

15. A radio communications device according to claim 14:

wherein said communications reference signal generator comprises a first oscillator having a first power consumption associated therewith; and wherein said base timing signal generator comprises a second oscillator having a second power consumption associated therewith which is less than said first power consumption.

16. A radio communications device, comprising:

a communications reference signal generator which produces a communications reference signal;

a radio communications circuit, responsive to said communications reference signal generator, which communicates radio communications messages;

reference-compensated power timing signal generating means, responsive to said communications reference signal generator and to said radio communications circuit, for producing a reference-compensated power timing signal which is compensated according to said communications reference signal, the reference-compensated power timing signal generating means including:

a reference-compensated power interval determining means, responsive to said communications reference signal generator, for determining a reference-compensated power interval for the power timing signal, the reference-compensate power interval being compensated according to said communications reference signal; and selective power transfer enabling means, responsive to said power down timing signal generator, for selectively enabling power transfer between said power source and said communications reference signal generator and for selectively enabling power transfer between said power source and said radio communications circuit based on said reference-compensated power timing signal.

17. A radio communications device, comprising:

a communications reference signal generator which produces a communications reference signal;

a radio communications circuit, responsive to said communications reference signal generator, which communicates radio communications messages;

a power source which supplies electrical power;

a base timing signal generator which produces a base timing signal;

reference-compensated power interval determining means, responsive to said base timing signal generator, to said communications reference signal generator and to said radio communications circuit, for determining first and second reference-compensated power intervals for said communications reference signal generator and said radio communications circuit, respectively, each of which are defined according to said base timing signal and compensated according to said communications reference signal;

power timing signal generating means, responsive to said reference-compensated power interval determining means, for generating said power timing signal according to the determined first and second reference-compensated power intervals; and selective power transfer enabling means, responsive to said reference-compensated power interval determining means, for selectively enabling power transfer between said power source and said communications reference signal generator and for selectively enabling power transfer between said power source and said radio communications circuit according to said power timing signal.

18. A radio communications device according to claim 17:

wherein said reference-compensated power interval determining means comprises means for determining first and second reference-compensated power down intervals for said communications reference signal generator and said radio communications circuit, respectively;

wherein said power timing signal generating means comprises means, responsive to said reference-compensated power down interval determining means, for generating first and second power down signals according to the determined first and second reference-compensated power down intervals, respectively; and wherein said selective power transfer enabling means comprises means, responsive to said means for generating respective first and second power down signals, for disabling power transfer between said power source and said communications reference signal generator for said first power down interval in response to said first power down signal and for disabling power transfer between said power source and said radio communications circuit for said second reference-compensated power down interval in response to said second power down signal.

19. A radio communications device according to claim 18:

wherein said reference-compensated power interval determining means further comprises means for determining first and second power up intervals for said communications reference signal generator and for said radio communications circuit, respectively;

wherein said power timing signal generating means comprises means, responsive to said means for determining first and second power up intervals, for generating first and second power up signals according to the determined first and second power up intervals, respectively; and wherein said selective power transfer enabling means comprises means for enabling power transfer between said power source and said communications reference signal generator for said first power up interval in response to said first power up signal and for enabling power transfer between said power source and said radio communications circuit for said second power up interval in response to said second power up signal.

20. A radio communications device according to claim 19:

wherein said reference-compensated power interval determining means further comprises means, responsive to said radio communications circuit, for producing a power down start signal;

wherein said means for generating first and second power down signals comprises means, responsive to said means for producing a power down start signal, for generating said first and second power down signals in response to said power down start signal;

wherein said means for generating first and second power up signals comprises means, responsive to said reference-compensated power down interval determining means, for generating said first power up signal in response to occurrence of a first predetermined number of cycles of said base timing signal and for generating said second power up signal in response to occurrence of a second predetermined number of cycles of said base timing signal, said first and second predetermined numbers corresponding to said first and second power down intervals, respectively.

21. A radio communications device according to claim 20, wherein said means for generating first and second power up signals generates said first power up signal before said second power up signal such that said selective power transfer enabling means enables power transfer between said power source and said communications reference signal generator while disabling power transfer between said power source and said radio communications circuit.

22. A radio communications device, comprising:

a communications reference signal generator which produces a communications reference signal;

a radio communications circuit, responsive to said communications reference signal generator, which communicates radio communications messages;

a power source which supplies electrical power;

a base timing signal generator which produces a base timing signal;

reference-compensated power interval determining means, responsive to said base timing signal generator, to said communications reference signal generator and to said radio communications circuit, for determining a reference-compensated power interval for said radio communications circuit which is defined according to said base timing signal and compensated according to said communications reference signal;

power timing signal generating means, responsive to said reference-compensated power interval determining means, for generating a power timing signal according to the determined reference-compensated power interval;

selective power transfer enabling means, responsive to said power timing signal generating means, for selectively enabling power transfer between said power source and said radio communications circuit according to said power timing signal; and means, responsive to said radio communications circuit, for de-energizing said communications reference signal generator while said radio communications circuit is de-energized and for energizing said communications reference signal generator a sufficient time before said radio communications circuit is energized to allow said communications reference signal to achieve a predetermined accuracy.

23. A radio communications device according to claim 22:

wherein said reference-compensated power interval determining means comprises means for determining said reference-compensated power interval when said communications reference signal has said predetermined accuracy.

24. A radio communications device according to claim 23:

wherein said reference-compensated power interval determining means comprises means for determining a reference-compensated power down interval for said radio communications circuit;

wherein said power timing signal generating means comprises means, responsive to said reference-compensated power down interval determining means, for generating a power down signal according to the determined reference-compensated power down interval; and wherein said selective power transfer enabling means comprises means, responsive to said means for generating a power down signal, for disabling power transfer between said power source and said radio communications circuit for said reference-compensated power down interval in response to said power down signal.

25. A radio communications device according to claim 24:

wherein said reference-compensated power interval determining means further comprises means for determining a power up interval for said radio communications circuit;

wherein said power timing signal generating means comprises means, responsive to said means for determining a power up interval, for generating a power up signal according to the determined power up interval; and wherein said selective power transfer enabling means comprises means for enabling power transfer between said power source and said radio communications circuit for said power up interval in response to said power up signal.

26. A radio communications device according to claim 25:

wherein said reference-compensated power interval determining means further comprises means, responsive to said radio communications circuit, for producing a power down start signal;

wherein said means for generating a power down signal comprises means, responsive to said means for producing a power down start signal, for generating the power down signal in response to said power down start signal;

wherein said means for generating a power up signal comprises means, responsive to said reference-compensated power down interval determining means, for generating the power up signal in response to occurrence of a predetermined number of cycles of said base timing signal.

27. A radio communications device according to claim 23, wherein said means for de-energizing said communications reference signal generator de-energizes said communications reference signal generator upon de-energizing of said radio communications circuit.

28. A method of controlling power consumption of a radio communications device that includes a communications reference signal generator which produces a communications reference siganl and a power source which supplies power, the method comprising the steps of:

generating a base timing signal;

compensating the base timing signal according to the communications reference signal to produce a reference-compensated power timing signal; and selectively enabling power transfer between the power source and the communications reference signal generator based on the reference-compensated power timing signal.

29. A method of controlling power consumption of a radio communications device including a communications reference signal generator which produces a communications reference signal and a power source which supplies power, the method comprising the steps of:

generating a base timing signal;

determining a reference-compensated power interval which is defined according to the base timing signal and which is compensated according to the communications reference signal;

generating the power timing signal according to the determined reference-compensated power interval; and selectively enabling power transfer between the power source and the communications reference signal generator according to the power timing signal.

30. A method according to claim 29:

wherein said step of determining a reference-compensated power interval comprises the step of determining a reference-compensated power down interval;

wherein said step of generating a power timing signal comprises the step of generating a power down signal according to the determined reference-compensate power down interval; and wherein said step of selectively enabling power transfer comprises the step of disabling power transfer between the power source and the communications reference signal generator for the determined reference-compensated power down interval in response to the power down signal.

31. A method according to claim 30:

wherein said step of determining a reference-compensated power interval comprises the step of determining a power up interval;

wherein said step of generating a power timing signal comprises the step of generating a power up signal according to the determined power up interval; and wherein said step of selectively enabling power transfer comprises the step of enabling power transfer between the communications reference signal generator and the power source for the determined power up interval in response to the power up signal.

32. A method according to claim 29, wherein the radio communications device includes a radio communications circuit which is responsive to the communications reference signal generator and communicates radio communications messages, and further comprising the step of:

selectively energizing the radio communications circuit according to the compensated time base.

33. A method acceding to claim 32, wherein the radio communications device includes a power source which supplies power, and:

wherein said step of selectively energizing the radio communications circuit comprises the steps of:

determining a reference-compensated power interval which is defined according to the base timing signal and which is compensated according to the communications reference signal; and generating a power timing signal according to the determined reference-compensated power interval;

wherein said step of selectively energizing the communications reference signal generator comprises the step of selectively enabling power transfer between the power source and the communications reference signal generator in response to the power timing signal; and wherein said step of selectively energizing the radio communications circuit comprises the step of selectively enabling power transfer between the power source and the radio communications circuit in response to the power timing signal.

34. A method according to claim 33:

wherein said step of determining a reference-compensated power interval comprises the step of determining first and second reference-compensated power down intervals for the communications reference signal generator and the radio communications circuit, respectively;

wherein said step of generating a power timing signal comprises the step of generating first and second power down signals according to the determined first and second reference-compensated power down intervals, respectively;

wherein said step of selectively enabling power transfer between the power source and the communications reference signal generator comprises the step of disabling power transfer between the power source and the communications reference signal generator for the first reference-compensated power down interval in response to the first power down signal; and wherein said step of selectively enabling power transfer between the power source and the radio communications circuit comprises the step of disabling power transfer between the power source and the radio communications circuit for the second reference-compensated power down interval in response to the second power down signal.

35. A method according to claim 34:

wherein said step of determining a reference-compensated power interval comprises the step of determining first and second power up intervals for the communications reference signal generator and the radio communications circuit, respectively;

wherein said step of generating a power timing signal comprises the step of generating first and second power up signals according to the determined first and second power up intervals, respectively;

wherein said step of selectively enabling power transfer between the power source and the communications reference signal generator comprises the step of enabling power transfer between the power source and the communications reference signal generator for the first power up interval in response to the first power up signal; and wherein said step of selectively enabling power transfer between the power source and the radio communications circuit comprises the step of enabling power transfer between the power source and the radio communications circuit for the second power up interval in response to the second power up signal.

36. A method according to claim 34:

wherein said step of generating first and second power up signals comprises the steps of:

generating the first power up signal; and then generating the second power up signal, to thereby enable power transfer between the power source and the communications reference signal generator while disabling power transfer between the power source and the radio communications circuit.

37. A method of controlling power consumption of a radio communications device including a communications reference signal generator which produces a communications reference signal and a radio communications circuit, responsive to the communications reference signal generator, which communicates radio communications messages, the method comprising the steps of:

selectively energizing the radio communications circuit according to a reference-compensated time base which is compensated according to the communications reference signal; and de-energizing the communications reference signal generator for a determined reference-compensated power interval while the radio communications circuit is de-energized, wherein the determined reference-compensated power interval is compensated according to said communications reference signal; and energizing the communications reference signal generator a sufficient time before the radio communications circuit is energized to allow the communications reference signal to achieve a predetermined accuracy using the reference-compensated time base.

38. A method of controlling power consumption of a radio communications device that includes a communications reference signal generator which produces a communications reference signal generator, which communicates radio communication message, and a power source which supplies electrical power, and a base timing signal generator which produces a base timing signal, the method comprising the steps of:

determining a reference-compensated power interval for the radio communications circuit which is defined according to the base timing signal and compensated according to the communications reference signal;

generating a power timing according to the determined reference-compensated power interval;

selectively enabling power transfer between the power source and the radio communications circuit according to the power timing signal;

de-energizing the communications reference signal generator while the radio communications circuit is de-energized; and energizing the communications reference signal generator a sufficient time before the radio communications circuit is energized to allow the communications reference signal to achieve a predetermined accuracy.

39. A method according to claim 38:

wherein said step of determining a reference-compensated power interval comprises the step of determining a reference-compensated power interval defined as a predetermined number of cycles of the base timing signal.

40. A method according to claim 39:

wherein said step of determining a reference-compensated power interval comprises the step of determining the reference-compensated power interval when the communications reference signal has the predetermined accuracy.

41. A method according to claim 40, wherein said step of de-energizing the communications reference signal generator comprises the step of de-energizing the communications reference signal generator upon de-energizing of the radio communications circuit.

* * * * *

UNITED STATES PATENT AND TRADEMARK OFFICE
CERTIFICATE OF CORRECTION

PATENT NO. : 6,047,169
DATED : April 4, 2000
INVENTOR(S) : Paul Wilkinson Dent

It is certified that error appears in the above-indentified patent and that said Letters Patent is hereby corrected as shown below:

Column 22, line 33, please add -- signal -- following "power timing"

Signed and Sealed this

Thirteenth Day of March, 2001

*Attest:*

NICHOLAS P. GODICI

*Attesting Officer*     *Acting Director of the United States Patent and Trademark Office*